United States Patent [19]

Savage

[11] 4,386,321
[45] May 31, 1983

[54] DEVICE FOR ECONOMIZING DATA BANDWIDTH

[75] Inventor: Donald J. Savage, Danboro, Pa.

[73] Assignee: The United States of America as represented by the Secretary of the Navy, Washington, D.C.

[21] Appl. No.: 269,182

[22] Filed: Jun. 2, 1981

[51] Int. Cl.³ .................. H03B 15/00; H03K 21/00
[52] U.S. Cl. .................................. 328/25; 307/513; 377/48; 377/94
[58] Field of Search .................. 328/25, 26, 30; 307/513, 225 R, 236

[56] References Cited

U.S. PATENT DOCUMENTS 3,254,326  5/1966  Mann ............................ 307/236
3,593,166  7/1971  Martin, Jr. ..................... 328/30
3,602,824  8/1971  Rusch ............................ 328/25

Primary Examiner—Stanley D. Miller
Assistant Examiner—B. P. Davis
Attorney, Agent, or Firm—R. S. Sciascia; Henry Hansen

[57] ABSTRACT

Subharmonics of a data waveform are generated for the purpose of reducing data bandwidth prior to transmission. Input data waveform is phase split and the antiphased output signals are fed to a rectifier. The rectification of antiphased signals creates two pulsating voltage with opposite polarity. The pulsating voltages are alternately switched by a chopper to provide a sinusoidal signal. The sinusoidal signal is filtered to average the energy of the pulsating voltage to provide a smooth waveform of one-half the frequency of the input data waveform.

7 Claims, 5 Drawing Figures

DEVICE FOR ECONOMIZING DATA BANDWIDTH

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

This invention relates to a device for reducing data bandwidth for passing signals through a bandwidth restricting system and to do so without loss of data.

Present methods for passing data through bandwidth restricting systems involve ensemble sampling and data editing, both of which results in data loss. Manipulating bandwidth in time using deltics and memories results in extending the time required to pass the data, or increasing the bandwidth neither of which solve the basic problem. The invention relates to a bandwidth reduction device utilized in a sonobuoy system and more particularly to a device for generating subharmonics for reduction of bandwidth in which signals are divided in frequency for transmission and subsequently recreated into the original signal by a receiving station having a display means with X-axis calibrated for two times the bandwidth range. Techniques are now used for changing the frequency of sounds produced by musical instruments. For example, division of a fixed known frequency is accomplished by synchronizing a subharmonic oscillator with a known frequency to produce a subharmonic sinusoidal output. Another technique converts sinusoids into square waves at half the input frequency and then reconverts them into sinusoidals through tank circuit filtering. These techniques provide output tones that have an entirely different quality sounding completely different from those characterized by the original source. Additionally the original amplitude envelope is lost in the division of frequencies.

SUMMARY OF THE INVENTION

Accordingly, the general purpose and object of this invention is to provide an improved device for reducing data bandwidth without loss of data, phase distortion and reduction of signal-to-noise ratio. Without loss refers to a data level increase with relation to the noise by an amount equivalent to the change in the time bandwidth product; data means, that data which is part of a coherent signal and which when added coherently increases by 6 dbv. Another object is to provide a simple, versatile inexpensive subharmonic generating device. Still another object is to provide a device which causes the bandwidth to be reduced by an integer factor. Yet another object is to provide a device which does phase processing and bandwidth reduction without increasing processing time. Another object is to provide a device to reduce FM and AM noise from the data. It is a further purpose of the invention to provide a device for receiving signals from a bandwidth and to reduce that bandwidth by integer factors and to reduce signal-to-noise ratio prior to transmission.

Briefly, these and other objects of the present invention are accomplished by a device which receives and inverts a signal, chops the two at one half the input signal frequency and outputs the chopped signal. The output signal is one half the frequency of the input signal but retains the same amplitude as the input signal.

These and other objects of the invention can be more readily understood, and more particularly the means for economizing data bandwidth as well as its manner of construction and use, will be more readily appreciated from the following detailed description taken in conjunction with the accompanying drawings forming a part thereof, in which:

DESCRIPTION OF THE PREFERRED EMBODIMENT

Figure 1:
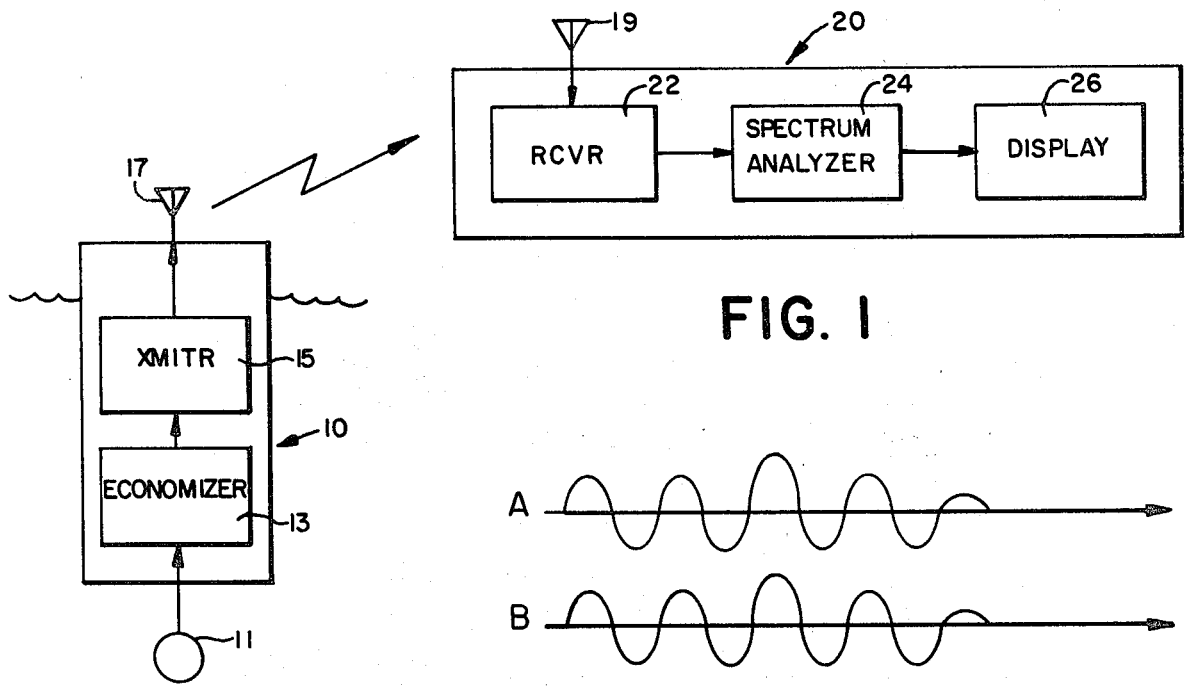
FIG. 1 is a block diagram of a sonobuoy and remote receiving station utilizing an economizer according to the invention.

Referring now to the drawings, wherein like reference characters designate like or corresponding parts throughout the several views, there is illustrated in FIG. 1 a system comprising a sonobuoy 10 and a remote receiving station 20. Sonobuoy 10 comprises a hydrophone 11 for receiving acoustic information and converting it into a voltage. Hydrophone 11 is operatively connected to data bandwidth economizer 13 which electronically divides all received frequencies making up the information by an integer factor n thereby reducing the bandwidth accordingly. The output of data bandwidth economizer 13 is connected to transmitter 15 which provides an R.F. carrier for the data. The modulated R.F. carrier frequency or composite output signal of transmitter 15 is transmitted from antenna 17 to remote receiving station 20. A receiving antenna 19 intercepts the composite signal and connects it to the input of receiver 22. Receiver 22 which is tuned to the R.F. carrier, amplifies it, removes the information from the carrier and connects it to a spectrum analyzer 24. Spectrum analyzer 24, a Fast Fourier Transform type analyzer, electronically processes the information received from the output of receiver 22 into frequency domain information and connects the frequency domain information to a display 26. The acoustic information received by hydrophone 11 is now visually displayed in the frequency domain on display 26 in the remote receiving station 20.

Figure 2:
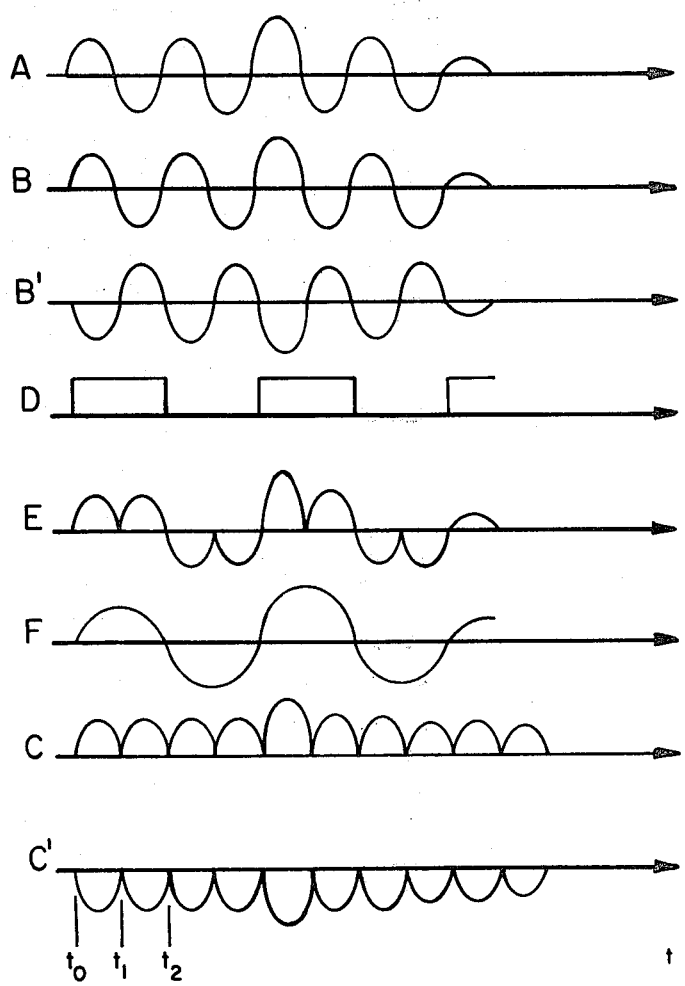
FIG. 2 is a timing diagram of the signals within the economizer of FIG. 1.
Figure 3:
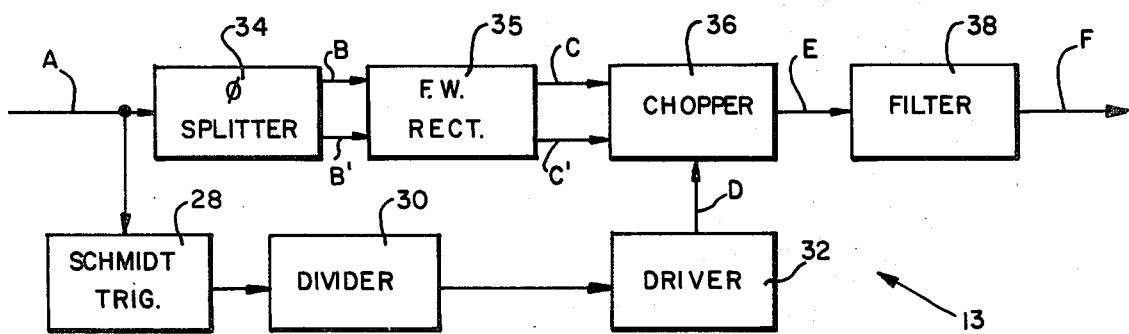
FIG. 3 is a block diagram of component circuits of the economizer according to the invention.

Referring now to FIGS. 2 and 3, signal A is connected from hydrophone 11 simultaneously to phase splitter 34 and schmidt trigger 28. Phase splitter 34 receives the input signal A and provides two output signals B and B'. B is a replica of signal A. B' has the same frequency and amplitude as signal A but is inverted 180°. Signals B and B' are connected to the inputs of full wave rectifier 35 which provides output signals C and C'. Signal C is a full wave rectification of signal B. Signal C' is a full wave rectification of signal B'. Signals C and C' are connected to the input of chopper 36 which provides chopped signal E, the first period of which by way of example consists of the first and second cycles of signal C and the third and fourth cycles of signal C', continuing alternately in this manner until signal A is not present at the input. Signal E is connected to a filter 38 which will allow all the frequencies in the band of interest to pass unattenuated but will attenuate all frequencies above that band of interest. For the test signal of FIG. 4, filter 38 is a low pass filter with a cutoff frequency of 600 hertz. The output signal F of filter 38 has a period twice that of signal A and an amplitude equivalent to the average amplitudes of the cycles of signal E. Schmidt trigger 28 upon reception of signal A provides an output square wave signal having the same frequency as that of signal A. Schmidt trigger 28 is connected to the input of flip flop 38. Flip flop 30 receives the square wave signal and divides it by two providing a square wave signal which is one half the frequency of signal A to chopper driver 32. Chopper driver 32 connected to receive the signal from flip flop 30, outputs a signal D as shown in FIG. 3 to turn on chopper 36 to allow signal C to pass through when signal D is in the high state and to allow signal C' to pass through when signal D is in the low state.

Additional economizers may be placed in series to provide a further reduction of bandwidth for each economizer added. Operation of the data bandwidth economizers is now summarized. A sonobuoy 10 containing a data bandwidth economizer 13 is deployed in an ocean environment wherein the hydrophone 11 receives sound pressure levels and converts said sound pressure levels into a voltage which is connected to the data bandwidth economizer 13. Economizer 13 automatically converts a received frequency to one half of that frequency or one quarter or one third or one fifth depending on the number of economizer 13 that are placed in series. The information signal F on the output of economizer 13 contains subharmonic of those frequencies that were picked up by hydrophone 11 and is connected to transmitter 15. The carrier frequency of transmitter 15 is modulated by signal F and transmitted from antenna 17. The transmitted signal is received by a remote receiving station 20 through an antenna 19 and is connected to receiver 22 for demodulation of the carrier to yield the information. Spectrum analyzer 24 receives the information, processes it and sends it to a display 26 which formats the information in the frequency domain with the X-axis calibrated to include the range of frequencies of the original bandwidth. For example, a 10,000 hertz frequency received by the hydrophone and connected through a one stage data bandwidth economizer will provide division of that frequency to 5000 hertz however the display format will automatically indicate that the signal is 10,000 hertz because of the X-axis calibration.

Figure 4:
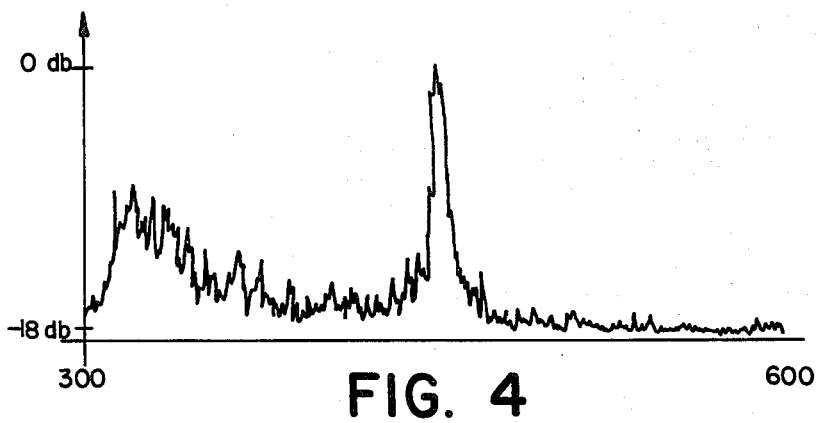
FIG. 4 is a graph of a typical frequency spectrum of a signal to the economizer of FIG. 3.
Figure 5:
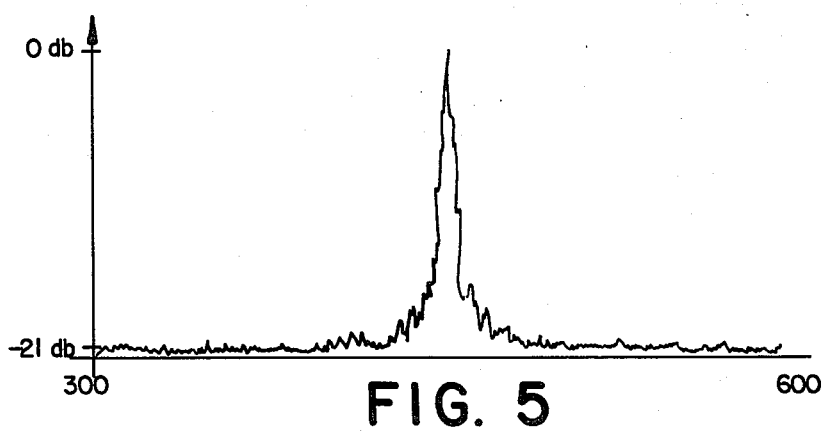
FIG. 5 is a graph of the frequency spectrum of the signal of FIG. 4 after processing through the economizer of FIG. 3.

Signal A applied to economizer 13 connects simultaneously to phase splitter 34 and schmidt trigger 28. Phase splitter 34 provides signals B and B' to full wave rectifier 35 which provides signals C and C' to chopper 36. Chopper 36 provides signal E to filter 38 which provides signal F. Schmidt trigger 28 provides a square wave having the same frequency as the input signal. Flip flop 30 divides the schmidt trigger output by two and connects the one-half frequency square wave signal into chopper driver 32. Output signal D causes chopper 36 to alternately switch signal C and C' into filter 38. FIG. 4 shows a test signal which was not passed through the bandwidth economizer but, which was processed by a spectrum analyzer. FIG. 5 shows the same test signal processed by the same spectrum analyzer but which test signal was passed through the bandwidth economizer. The signal to noise ratio of the predominant frequency line has increased by approximately 3 decibels.

Therefore, some of the many advantages of the present invention should now be apparent. In summary, the use of a data bandwidth economizer to reduce bandwidth for passing data through a bandwidth restricted system without loss of data allows the use of communication systems with narrower bandwidth or alternatively allows the passage of information having wider bandwidths than the communications system. Through the use of the economizer, there is a reduction of the processing burden, an increase in amount of data that can be handled and an increase in signal to noise gain. The subharmonic data band output from the data band economizer contains less FM and AM noise on the signal than the normal band equivalent.

Obviously, many modifications and variations of the present invention are possible in light of the above teachings. It is therefore to be understood that, within the scope of the appended claims, the invention may be practiced otherwise than as specifically described.

What is claimed is:
1. A frequency divider comprising:
 first means adapted to receive an alternating electrical signal for providing first and second signals, the first being a replica of the alternating electrical signal and the second being 180° phase shifted from the first:
 second means adapted to receive the first and second signals for rectifying the signals;
 third means adapted to receive the alternating electrical signal for dividing the frequency thereof by two and providing a switching signal;
 fourth means connected to receive the rectified signals and the switching signal for alternately passing one of the rectified signals; and
 fifth means connected to receive the alternately passed signals for filtering out high frequencies thereof.
2. A frequency divider as recited in claim 1, wherein said first means further comprises:
 a phase splitter.
3. A frequency divider as recited in claim 1, wherein said second means further comprises:
 a full-wave rectifier.
4. A frequency divider as recited in claim 1, wherein said third means further comprises:
 Schmidt trigger means adapted to receive said electrical signal for generating a square wave signal having the same frequency as the electrical signal;
 divider means connected to receive the square wave signal for providing a divided signal having one-half the frequency of the electrical signal and;
 driver means connected to receive the divided signal for providing a switching signal to said fourth means.
5. A device for dividing the frequency of an electrical signal comprising:
 phase splitter means for passing said electrical signal and simultaneously phase shifting said electrical signal for providing first and second signals, the second signal being 180° out of phase with the first signal;
 full-wave rectifier means connected to receive and rectify said first and second signals for providing third and fourth signals of opposite polarities;

divider means adapted to receive the electrical signal for dividing the frequency thereof by two and providing a switching signal;

chopper means connected to receive said third and fourth signals and said switching signal for producing a fifth signal consisting alternately of adjacent polarity pairs of the third and fourth signals having a period which is a multiple factor of the electrical signal; and filter means connected to said chopper means for averaging the energy in each period of the fifth signal and producing a sixth signal of a range of frequencies.

6. A device of dividing the frequency of an electrical signal as recited in claim 5 wherein said divider means further comprises:

Schmidt trigger means adapted to receive the electrical signal for generating a square wave signal having the same frequency as the electrical signal; and divider connected to receive the square wave signal for providing a divided signal having one-half the frequency of the electrical signal.

7. A device for dividing the frequency of an electrical signal as recited in claim 6 wherein said divider further comprises:

driver means connected to receive the divided signal for providing the switching signal to said chopper means.

* * * * *